United States Patent Office 3,297,765
Patented Jan. 10, 1967

3,297,765
CYCLOBUTANEDITHIONES
Robert D. Lipscomb, Wilmington, Del., assignor to E. I. du Pont de Nemours and Company, Wilmington, Del., a corporation of Delaware
No Drawing. Filed Oct. 7, 1963, Ser. No. 314,508
5 Claims. (Cl. 260—607)

This invention relates to new syclic organic compounds. In particular, it refers to new cyclobutanedithiones and to their preparation.

Compounds containing cyclobutane rings have been investigated extensively over the past years but, despite the wide range of studies in this field of cyclic compounds, no products are known which are cyclobutanes bearing hydrocarbon substituents and exocyclic sulfur atoms doubly bonded to nuclear carbons. Nothing is known of the characteristics of this class of compounds and their properties are not readily predicted.

In the present invention novel compounds have been obtained which are cyclobutanes bearing two exocyclic sulfur atoms doubly bonded to nuclear carbons in the 1,3 positions. The new class of compounds are defined generically as 2,2,4,4 - tetra(lower alkyl)-1,3 - cyclobutanedithiones. They are further defined by the following generic formula:

(1)

where R, R¹, R² and R³ are lower alkyl groups, i.e., open chain saturated hydrocarbons of 1–6 carbon atoms. The alkyl groups can be alike or different and they can be straight or branch-chained. In a preferred group of compounds of formula 1, R, R¹, R² and R³ are alkyl groups of up to 3 carbons, i.e., methyl, ethyl, propyl and isopropyl.

The new compounds are prepared by reacting a 2,2,4,4-tetra(lower alkyl)-1,3-cyclobutanedione with hydrogen sulfide by procedures which will be described fully in later paragraphs.

Representative illustrations of compounds of the invention are 2,2,4,4-tetramethyl-1,3 - cyclobutanedithione, 2,4-dimethyl-2,4-diethyl-1,3-cyclobutanedithione, 2,2,4,4-tetraethyl-1,3-cyclobutanedithione,2,2,4,4 - tetra-n-propyl-1,3-cyclobutanedithione, 2,2,4,4 - tetra - n-butyl - 1,3-cyclobutanedithione, 2,2,4,4-tetra - n-amyl - 1,3-cyclobutanedithione, 2,2,4,4-tetra - n-hexyl - 1,3 - cyclobutanedithione, and the like.

The new compounds are highly-colored products, usually deep shades of red. They sublime or distill readily when exposed to air but do not decompose. The compounds are stable over long periods at atmospheric temperature and pressue. They show no tendency to polymerize under these conditions. They have a mildly unpleasant ordor which does not resemble a mercaptan odor but which is associated frequently with sulfur compounds. The compounds can be stored in conventional closed containers, e.g., in containers of glass, polyethylene, poly(tetrafluoroethylene)resin and similar corrosion-resistant materials conventionally employed for handling chemical compounds.

The compounds are readily soluble in a wide range of organic liquids to form intensely colored solutions (usually red or shades of red) which can contain high concentrations (up to 20% or more by weight) of the solid porduct. To illustrate, the compounds are soluble in hydrocarbons (ligroin, gasoline, hexane, benzene, etc.), alcohols (methanol, ethanol, propanol, trifluoroethanol, cyclohexanol, phenol, etc.), amides (dimethylformamide, dimethylacetamide, etc.), ketones (acetone, methyl ethyl ketone, etc.), esters (ethyl acetate, methyl benzoate, etc.), fluorocarbons (perfluoro-1,4 - dimethylcyclohexane, hexafluorobenzene, etc.), and the like. The compounds are substantially insoluble in water.

The compounds possess a combination of properties (deep color, easily sublimed, characteristic odor, and wide range of solubilities) which make them attractive for use in many fields. They can, for example, be added in small quantities to a combustible gas to provide a warning odor in the event of leaks. The compounds can be used to impart a characteristic color to hydrocarbons, alcohols or other liquids employed in low temperature measurements.

The compounds are prepared, as stated earlier, by reacting a 2,2,4,4 - tetra(lower alkyl)cyclobutane - 1,3-dione with hydrogen sulfide. The reaction is preferably conducted in an acidic environment. This environment is conveniently obtained by employing a hydrogen halide, e.g., hydrogen fluoride, hydrogen chloride or hydrogen bromide. Hydrogen chloride is preferred in view of its ready availability and ease of operation. In the process the two ketonic oxygen atoms are replaced by two doubly bonded sulfur atoms and the reaction can be represented schematically by the following equation:

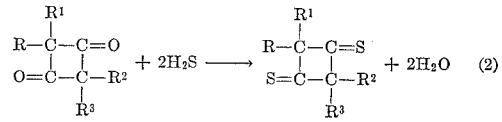

(2)

where R, R¹, R² and R³ are lower alkyl groups as defined in Formula 1. The molar ratio of reactants shown in Equation 2 represents ideal conditions and is not intended to be limiting.

Commercial hydrogen sulfide can be employed without special purification. The cyclobutane - 1,3-diones, employed as a second reactant, are dimers of di(lower alkyl) ketenes and are obtained by dimerization of the appropriate ketenes. The tetramethyl reactant is available commercially.

The reaction is preferably conducted in an inert liquid medium to provide close contact between the reactants. Alcohols are particularly appropriate liquid media for the reaction, e.g., methanol, ethanol, propanol, cyclohexanol, and the like. Other liquid media which are operable include phenols and lower alkanoic acids. It is not essential that the liquid medium be anhydrous.

The reaction is advantageously conducted in the presence of a catalyst, e.g., halides of polyvalent metals, which may form hydrates with the by-product water formed in the process. A catalyst is not essential for operability and is employed primarily to obtain increased yields of the desired cyclobutanedithiones. Examples of operable catalysts include zinc chloride, ferric chloride, aluminum chloride, and the like. Zinc chloride is a preferred and readily available catalyst.

The process is conducted most conveniently at atmospheric pressure. In a batch process, a corrosion-resistant vessel is charged with the liquid reaction medium, the cyclobutane-1,3-dione and, optionally, with a catalyst of the type described above. The mixture is stirred, preferably cooled and a hydrogen halide (e.g., hydrogen chloride) is passed into the mixture. This step in the process is exothermic and cooling of the reaction mixture is desirable. Passage of the hydrogen halide is continued until no further rise in temperature occurs. Passage of the hydrogen halide is stopped and hydrogen sulfide is now passed into the mixture. The reaction is mildly exothermic and the color of the mixture gradually changes to red or red-orange. Frequently, a crystalline product forms slowly as passage of the hydrogen sulfide is continued. The reaction is completed when there is no further evidence of rise in temperature or further separation of crystalline product, and passage of hydrogen sulfide is discontinued.

The tetra(lower alkyl)-1,3-cyclobutanedithione obtained in the above process is purified by conventional methods. The solid product can be separated by filtration, decantation and the like. Optionally, the reaction mixture can be diluted with water to form a mixture in which the dithione is relatively insoluble. The solid product can be purified by crystallization from appropriate solvents, e.g., methanol, ethanol or aqueous mixtures of these and other alcohols. Alternatively, the product can be purified by careful sublimation or distillation or impurities may be separated by gas chromatography procedures.

The process can be operated by continuous methods which are well known in engineering practice. To illustrate, the dione in solution in alcohol can be charged into a tube into which hydrogen chloride is passing and, at a point further on in the tube, hydrogen sulfide can be passed into the mixture which is finally removed continuously from the exit or discharge end.

The molar ratio in which the reactants are employed is not a critical factor in the process. Thus, in a batch process as described above, the ratio (moles dione/moles $H_2S$) at the start of the process is well over 100:1; in a continuous process with a large supply of hydrogen sulfide in the reaction tube, this ratio will be reversed. From the viewpoint of obtaining good yields of the desired dithione it is desirable to continue the reaction until at least one mole of $H_2S$ (and preferably, at least two moles) is consumed per mole of tetra(lower alkyl)-1,3-cyclobutanedione. It is not essential, however, to employ this ratio for operability.

The pressure at which the process is conducted is not critical. The process is most conveniently operated at atmospheric pressure but higher or lower pressures can be used.

The temperature at which the process is operated is not critical. The reaction proceeds rapidly and it is, in fact, exothermic. The temperature of the reaction is generally maintained at 50° C. or less by employing coolants or regulating the rate of addition of the gaseous hydrogen sulfide reactant. The temperature range can lie between about —20° C. to 50° C. although it is not essential to operate within these limits. A temperature range for operation which is easily attained and, therefore, preferred is about —5° to 30° C.

It is not essential to exclude water, i.e., to maintain anhydrous conditions, during operation. The normal amounts of moisture present in the atmosphere or in the organic liquids employed as reaction media will not adversely affect the reaction. The presence of large quantities of water is undesirable in view of the low solubility of the dithione product in water.

It is not essential to exclude air or oxygen during operation of the process. The safety precautions customarily observed in chemical operations should, of course, be followed in view of the known toxicity of hydrogen sulfide. The physiological properties of the tetra(lower alkyl)-1,3-cyclobutanedithiones have not yet been fully established and due care should be used in handling the products.

The following examples illustrate the compounds of the invention and the method of preparing them.

Example I

A glass reaction vessel (1000 ml. capacity) is employed which is fitted with an inlet tube, a thermometer, a stirrer and a reflux condenser which is connected to a series of traps through which exit gas can pass. The reaction vessel is charged with 400 ml. of methanol, 50 g. of 2,2,4,4-tetramethyl-1,3-cyclobutanedione and 25 g. of anhydrous zinc chloride. The mixture is stirred until a clear solution forms and it is then cooled to about —5° C. Cooling of the solution is maintained and hydrogen chloride is passed into the solution for about 75 minutes. The temperature of the solution rises during this step to about 24° C. and then drops again to about —2° C. Addition of hydrogen chloride is stopped at this point and addition of hydrogen sulfide is started. Passage of hydrogen sulfide into the solution is continued for about 3 hours. The temperature of the solution rises a few degrees and its color changes through pink to red-orange. Hydrogen sulfide addition is maintained for about 18 hours more at a reaction temperature of about 0° C. Many crystals separate from the mixture during this period.

The crystals are removed by filtration, washed at 0° C. with 20–30 ml. of methanol and dried for a short period to obtain 47 g. of crude 2,2,4,4-tetramethyl-1,3-cyclobutanedithione as a slightly sticky red solid.

The filtrate from the above separation is returned to the reaction vessel, cooled to 0° C. and 250 ml. of distilled water is added slowly at a temperature below about 15° C. A red solid precipitates which is separated by filtration, washed with 15 ml. of methanol and dried to obtain 12 g. more of the desired crude product; total yield, 59 g.

The crude product is dissolved in 140 ml. of methanol at 60° C. The solution is cooled to about 40° C., seeded with a crystal of the dithione, and cooled further to —5° C. The red crystals which form are separated by filtration, washed with 10–15 ml. of methanol and dried to obtain 30.5 g. of pure 2,2,4,4-tetramethyl-1,3-cyclobutanedithione as red platelets, melting at 125–126° C.

The product, 2,2,4,4 - tetramethyl - 1,3 - cyclobutanedithione, is a raspberry-red, volatile solid with a mild unpleasant odor which, however, does not suggest a mercaptan. It is insoluble in water but very soluble in most all organic solvents. The nuclear magnetic resonance spectrum of the compound shows a single resonance at —1.59 p.p.m. from tetramethylsilane as a reference. The ultraviolet spectrum shows absorption at the following wavelengths (expressed as m$\mu$): 500 ($\epsilon$=22), 298 ($\epsilon$=297), and 226 ($\epsilon$=22,500). Shoulders on the absorption curve appear at 550 and 315 m$\mu$. In the infrared absorption curve the principal bands are found at the following wavelengths (expressed as $\mu$): 3.3–3.5, 6.8–7.3, 7.85 (strong), 9.25 and 14.2. There is no band characteristic for carbonyl (C=O) absorption. The molecular weight is confirmed by mass spectrometric analysis and yields a fragmentation pattern of ions that is in accordance with its structure.

Example II

The process described in Example I is repeated employing 400 ml. of absolute ethanol, 50 g. of 2,2,4,4-tetramethyl-1,3-cyclobutanedione, and 25 g. of anhydrous $ZnCl_2$. Hydrogen chloride gas is passed into the mixture in the first phase for 4.5 hours and in the second phase hydrogen sulfide is bubbled through slowly for 2–3 days. Temperatures are controlled as described in Example I. At the end of this period many red crystals are present in the reaction mixture. The cooled mixture is filtered and 35 g. of red crystals are collected. The filtrate is cooled again and 250–300 ml. of water is added dropwise. Red crystals form which are separated to obtain 16 g. more of the product; total yield, 51 g. A portion of the product is recrystallized from methanol to obtain pure 2,2,4,4-tetramethyl-1,3-cyclobutanedithione, melting at 125.5–127° C. The identity of the product is confirmed by its infrared absorption spectrum and by elemental analysis.

*Analysis.*—Calc'd. for $C_8H_{12}S_2$: C, 55.8; H, 7.1; S, 37.2. Found: C, 55.7; H, 7.1; S, 37.7.

Example III

This example illustrates operation of the process in the absence of a catalyst. A reaction vessel of 500 ml. capacity is employed which is equipped as described in Example 1. The vessel is charged with 20 g. of 2,2,4,4-tetramethyl-1,3-cyclobutanedione and 200 ml. of absolute ethanol. The procedure described in Example 1 is now followed and hydrogen chloride is passed into the mixture for the first step and hydrogen sulfide is passed into it for the second step.

The mixture turns red but crystals do not normally separate in this manner of operation, i.e., in the absence of a catalyst. The crude reaction mixture is distilled and the red distillate, which contains ethanol and the dithione, is diluted with water. A red oil (11.8 g.) is isolated and cooled. A red crystalline product forms slowly and it is separated. The crystalline product is shown by elemental analysis and by mass and nuclear magnetic resonance spectra to contain both the dithione and the monothione. The dithione, i.e., 2,2,4,4 - tetramethyl - 1,3 - cyclobutanedithione, is separated from the mixture by gas chromatography. The dithione can also be separated by fractional crystallization procedures, if desired.

The processes of Examples 1, 2 and 3 are generic for the preparation of the compounds of the invention. To illustrate, hydrogen sulfide can be reacted with 2,2,4,4-tetraethyl-1,3-cyclobutanedione to obtain 2,2,24,4-tetraethyl - 1,3 - cyclobutanedithione, with 2,4 - diethyl-2,4-dimethyl-1,3-cyclobutanedione to obtain 2,4-diethyl-2,4-dimethyl-1,3-cyclobutanedithione, with 2,2-dimethyl-4,4-diethyl-1,3-cyclobutanedione to obtain 2,2-dimethyl-4,4-diethyl - 1,3 - cyclobutanedithione, with 2 - ethyl - 2,4,4-trimethyl-1,3-cyclobutanedione to obtain 2-ethyl-2,4,4-trimethyl - 1,3 - cyclobutanedithione, with 2,2,4,4 - tetra - n-propyl - 1,3 - cyclobutanedione to obtain 2,2,4,4 - tetra-n-propyl-1,3-cyclobutanedithione, and the like. Other tetra (lower alkyl)-1,3-cyclobutanediones which can be employed include 2,2,4,4-tetra-n-butyl-1,3-cyclobutanedione, 2,2,4,4-tetra-n-amyl-1,3-cyclobutanedione, 2,2,4,4-tetra-n-hexyl-1,3-cyclobutanedione, and the like to obtain the corresponding dithiones named in an earlier paragraph.

In the processes of Examples 1 and 2, other chlorides, e.g., aluminum chloride of ferric chloride, can be used in place of zinc chloride.

The compounds of the invention are useful as fugitive dyes for the temporary marking and identification of objects, particularly cellulosic objects, during processing. To illustrate, a solution is prepared consisting of about 20% by weight of 2,2,4,4-tetramethyl-1,3-cyclobutanedithione in denatured alcohol. Portions of the solution, which is deep red, are applied in separate identifying patterns to sections of cellulose sheets which are to be used in a test process of short duration. The identifying marks remain on the sheets for a sufficient time to complete the test and, after less than two hours in air, the dye marks have disappeared (sublimed), leaving the sheets in the original unmarked form.

The compounds are useful as warning agents in trace amounts for leaks of hazardous vapors. To illustrate, natural gas is passed through a vessel containing a small quantity of 2,2,4,4 - tetramethyl - 1,3-cyclobutanedithione. The natural gas acquires a distinctive mildly unpleasant odor which serves as a warning in the event of undersirable gas accumulation caused by a leak.

Solutions of the compounds of the invention in organic liquids are useful in temperature measuring devices. To illustrate, a deep red solution is prepared containing about 10% by weight of 2,2,4,4-tetramethyl-1,3-cyclobutanedithione in ethanol. A small bore heavy glass tube is partially filled with the solution and sealed. The column of solution contracts and expands with changes in temperature and the amount of change is easily observed in view of the deep color of the solution.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cyclobutane bearing two exocyclic sulfur atoms doubly bonded to nuclear carbons in the 1,3 positions of the cyclobutane ring.

2. A 2,2,4,4-tetra(lower alkyl)-1,3-cyclobutanedithione.

3. A compound of the formula

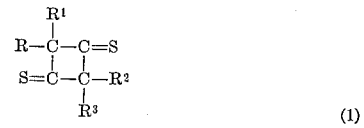

(1)

wherein R, $R^1$, $R^2$, and $R^3$ are alkyl groups of 1 to 6 carbon atoms.

4. A compound of claim 3 wherein R, $R^1$, $R^2$, and $R^3$ are alkyl groups of 1 to 3 carbon atoms.

5. 2,2,4,4-tetramethyl-1,3-cyclobutanedithione.

References Cited by the Examiner

UNITED STATES PATENTS 2,437,985   3/1948   Winkler et al. _____ 260—607

OTHER REFERENCES

Houben-Weyl: "Methoden der Organischen Chemie, Schwefel, Seleno-Tellur-Verbihdunger," vol. IX, p. 706 (1955).

CHARLES B. PARKER, *Primary Examiner.*

DELBERT R. PHILLIPS, *Assistant Examiner.*